(12) United States Patent
Reckemeier et al.

(10) Patent No.: US 12,630,366 B2
(45) Date of Patent: May 19, 2026

(54) SYSTEM FOR STORAGE OF GOODS CARRIERS

(71) Applicant: Dematic GmbH, Heusenstamm (DE)

(72) Inventors: Hartwig Reckemeier, Rodgau (DE);
Nicolas Michels, Frankfurt (DE);
Sebastian Müller, Dieburg (DE);
Edwin Prince Joseph, Frankfurt (DE);
Traian Gligor, Krombach (DE);
Matthias Wehner, Neu-Isenburg (DE)

(73) Assignee: Dematic GmbH, Heusenstamm (DE)

( * ) Notice: Subject to any disclaimer, the term of this patent is extended or adjusted under 35 U.S.C. 154(b) by 574 days.

(21) Appl. No.: 18/042,414

(22) PCT Filed: Aug. 16, 2021

(86) PCT No.: PCT/EP2021/072751
§ 371 (c)(1),
(2) Date: Feb. 21, 2023

(87) PCT Pub. No.: WO2022/043116
PCT Pub. Date: Mar. 3, 2022

(65) Prior Publication Data
US 2023/0322489 A1 Oct. 12, 2023

(30) Foreign Application Priority Data
Aug. 24, 2020 (EP) ...................................... 20192434

(51) Int. Cl.
*B65G 1/137* (2006.01)
(52) U.S. Cl.
CPC .................................. *B65G 1/1375* (2013.01)

(58) Field of Classification Search
CPC ..................................................... B65G 1/1375
See application file for complete search history.

(56) References Cited

U.S. PATENT DOCUMENTS 4,743,157 A 5/1988 Takatsuki
4,856,956 A * 8/1989 Zur ...................... B65G 1/0435
414/280

(Continued)

FOREIGN PATENT DOCUMENTS

CN 110869294 A 3/2020
CN 110949931 A 4/2020

(Continued)

OTHER PUBLICATIONS

International Search Report and Written Opinion from corresponding Patent Cooperation Treaty (PCT) Application No. PCT/EP2021/072751, completed Nov. 10, 2021.

*Primary Examiner* — Kyle O Logan
(74) *Attorney, Agent, or Firm* — Gardner, Linn, Burkhart & Ondersma LLP

(57) ABSTRACT

A system for storage of goods carriers with a rack having storage shelves for the goods carriers on multiple levels, with a rack-servicing machine for storage of goods carriers into the storage shelves and for discharge of goods carriers from the storage shelves. The rack-servicing machine runs along tracks extending the longitudinal extension of the rack, preferably in an aisle between two racks, and is configured to service at least one level, where the goods carriers have at least two pockets correspondingly located in respective opposite side walls configured to allow interaction with the load handler of the rack-servicing machine.

10 Claims, 10 Drawing Sheets

(56)                    References Cited

U.S. PATENT DOCUMENTS

|                    |         |                   |                |
|--------------------|---------|-------------------|----------------|
| 7,991,505 B2 *     | 8/2011  | Lert, Jr. ............... | B65G 1/0492 |
|                    |         |                   | 700/214        |
| 2009/0074545 A1 *  | 3/2009  | Lert, Jr. ............... | B65G 1/1378 |
|                    |         |                   | 414/267        |
| 2010/0290874 A1 *  | 11/2010 | Wolkerstorfer ...... | B65G 1/0435 |
|                    |         |                   | 414/280        |
| 2011/0008138 A1    | 1/2011  | Yamashita         |                |
| 2015/0357895 A1 *  | 12/2015 | Preuss .................... | H02K 41/02  |
|                    |         |                   | 310/12.01      |
| 2017/0341862 A1    | 11/2017 | Aschauer          |                |
| 2023/0312249 A1    | 10/2023 | Reckemeier et al. |                |
| 2023/0322489 A1 *  | 10/2023 | Reckemeier ......... | B65G 1/0492 |
|                    |         |                   | 700/218        |
| 2025/0235352 A1 *  | 7/2025  | Shoham-Hazon .......................... |  |
|                    |         |                   | A61F 9/00736   |

FOREIGN PATENT DOCUMENTS

| DE | 4339056 A1      | 5/1995  |
|----|-----------------|---------|
| DE | 102008026326 A1 | 12/2009 |
| DE | 202011102596 U1 | 11/2011 |
| EP | 0776308 B1      | 11/2000 |
| EP | 1698573 B1      | 1/2008  |
| ES | 2403759 A1      | 5/2013  |
| JP | 2000118644 A    | 4/2000  |
| JP | 2001240212 A    | 9/2001  |
| JP | 2006160496 A    | 6/2006  |
| JP | 2006206270 A    | 6/2011  |
| WO | 2009079678 A1   | 7/2009  |
| WO | 2015027261 A1   | 3/2015  |
| WO | 2016168874 A1   | 10/2016 |

* cited by examiner

Fig. 5

SYSTEM FOR STORAGE OF GOODS CARRIERS

CROSS REFERENCE TO RELATED APPLICATION

The present application claims the priority benefits of International Patent Application No. PCT/EP2021/072751, filed on Aug. 16, 2021, and claims benefit of EP20192434.7, filed Aug. 24, 2020.

BACKGROUND AND FIELD OF THE INVENTION

The invention relates to a system for storage of goods carriers.

The use of goods carriers (trays, containers, totes etc.) for storage and handling of goods in order fulfilment systems is known.

They allow the standardization of material handling processes and devices even for small goods, which could otherwise not be handled safely in an automated fashion.

Such goods carriers are handled by automated storage and retrieval systems in automated warehouses, distribution centers and order fulfilment systems.

For example US 2011/008138 A1 discloses a transferring shuttle, which transfers package(s) between a pair of layered stacked racks in a three dimensional automated warehouse, includes a mobile platform which runs between the stacked racks; elastic mechanisms, which include telescoping rails that extend into the stacked racks and surround a package; and terminal fingers placed at the ends of the rails, which can move between an extended position, which allows the package to be engaged and a contracted position. The rails also contain inner fingers between the terminal fingers. The inner fingers can push the package further into the stacked rack than previously possible.

U.S. Pat. No. 7,991,505 B2 discloses in a similar manner use of finger tabs 304 that can be swiveled to engage notches 202 in the upper edge of the sidewalls of the rim of the trays. The notches are open as they are arranged on the upper edge.

These fingers swivel between an upright non-use position and an essentially extended horizontal use position, in which the fingers are positioned behind or in front of a goods carriers, tray, container etc. to pull or push it in determined direction.

Such use of fingers to handle the goods carriers has become an industry standard. It does however have certain disadvantages. If the goods carriers are stored double-deep or more, the telescope with the fingers needs to extend far into the rack, which in turn means that either the telescopes have a complicated construction or the automated storage and retrieval systems are larger in width to compensate for the multi-part telescopes.

Additionally, the goods carriers need to have space between them, so that the fingers may be positioned behind a goods carrier to pull it off a shelf onto the automated storage and retrieval system. Such gap however also leads to possible shifting of position and/or orientation of the goods carriers, which generates faults when trying to pull these of the shelves.

SUMMARY OF THE INVENTION

The present invention provides a system in which storage errors are at least reduced but preferably eliminated and in which the goods carriers may be stored in a more efficient, compact manner (multiple deep) and safely handled, by simplifying the telescopic extractor.

It has been recognized that if the goods carriers have at least two pockets correspondingly located in respective opposite walls configured to allow interaction with the load handling means of the rack-servicing machine, it is possible to "grab" the goods carriers from the side rather than pushing and pulling from behind/front. This in turn allows a gapless storage of the goods carriers, which increases reach of servicing machine and space usage in the rack. Such gapless storage has additional advantages in that the goods carriers abutting each other stabilize the respective positions as no space for movement exists between the goods carriers reducing shifting.

Beneficially the goods carriers have two corresponding pockets in each respective wall, one in each end area of the wall. This eases storage and retrieval, as the pockets may be used in different ways. For example the rear pockets in travel direction may be used for storage of the goods carriers, i.e. pushing them off the rack-servicing machine, allowing for deeper storage if necessary. Whereas the front pockets may be used for retrieval of the goods carriers, i.e. pulling them onto the rack-servicing machine, allowing for shorter extension of the load handling means of the rack-servicing machine, saving cycle time. Preferably the pockets are recesses or cavities in the wall. In other words, the goods carrier will have a rectangular base (bottom) with raised circumferential walls, two side walls and two end walls (front and back).

It is also preferred that the load handling means of the rack-servicing machine includes a load carrying area for carrying at least one goods carrier, the load carrying area having telescopic arms (load handling means) arranged on opposite sides and each configured with at least two fingers that can change between a retracted non-use position and an extended, preferably essentially horizontally orientated, use position using a movement mechanism. The fingers may be configured to engage into the pockets in the use position. To do so, it is preferred that the fingers are linearly retracted or extended by a movement mechanism. This allows to reduce the distance between the telescopic arms (load handling means) and the goods carriers as no room for a swivelling movement as in the prior art is necessary. This in turn enables to shorten the extension movement.

An option for the linear movement mechanism includes a driven gear and pinion mechanism. The linear movement mechanism may also include an end stop detector. The end stop detector may be mechanical and/or electrical. Preferably the linear movement mechanism includes a mechanical end stop for both retraction and extension movement. A proximity switch may be arranged and used to detect the position of the finger. In case of mechanical limits these shall have dampening properties in order to reduce force peaks and therefore increase life expectancy of the engaged elements.

The rack of the gear and pinion mechanism is preferably simultaneously used as a finger. Extension and reaction movement is primarily stopped by a mechanical end stop. Additionally one or more electromagnetic sensor(s) signal the current position of the finger. This functionality ensures the safety of the operating system and collisions between good carriers and fingers are reduced.

A photoelectric switch or light barrier may be arranged between the two telescopic arms, preferably in both end sections.

Edge detection of the goods carrier in general may be performed to align the telescopic arms and fingers with the position of the pockets in the goods carriers, for example if an engagement of pockets by the fingers was not successful. To do so the fingers are retracted and the telescopic arms are first centered to set a reference point. Then they are extended in direction of the goods carrier while a photoelectric switch or light barrier arranged between the two telescopic arms is active to detect the leading edge of the first goods carrier in the storage. Then based on this position determination the controller can deduce/calculate the position of the pockets correctly, as the dimensions of the goods carriers are known. This in turn allows the telescopic arms to be positioned with the fingers at that location.

To further optimize the storage and retrieval process, the rack-servicing machines may receive instructions to retrieve two goods carriers simultaneously that are abutting each other in the storage to save space (gapless storage, see above). To do so it is necessary to detect the edge of the goods carrier located first in the storage (as above for edge detection). Then based on the instruction to retrieve two goods carriers and their known dimensions, the controller on board can calculate and position the telescopic arm with the fingers at the position of the pockets in the goods carrier farthest in the storage to engage those and pull both goods carriers onto the rack-servicing machine.

To secure goods carriers on the rack-servicing machines during transportation, the fingers in the telescopic arms may be extended into the pockets thereby locking the goods carriers into position. If two goods carriers are transported at the same time, the outer finger pairs can each engage one of the two goods carriers.

To further optimize space utilization, the goods carriers are preferably full sized and half sized goods carriers. This meaning that based on footprint two half size goods carriers are the same size as a full sized goods carrier. Similar to paper sizes, for example A5 is half of A4 size. Small goods are placed/stored on the half size goods carriers and larger goods on the full sized goods carriers. This allows to either place a full sized goods carrier or two half sized goods carriers (rotated) in the same space. Preferably only a single goods is placed on or in each goods carrier. It is however also possible to place two or more goods on or in each goods carrier.

The pockets in the full sized goods carriers will be in the side walls (longer walls). The pockets in the half sized goods carriers will be in the end walls (front and back).

The rack-servicing machines may be single level servicing automated storage and retrieval machines of the shuttle type. These will preferably be configured to carry a single full sized goods carrier or two half size goods carriers (in rotated orientation, i.e. long side next to long side).

Preferably the goods carriers are trays, even more preferred trays of the two-piece kind. The trays used have a two-piece design that allows for safe transport and easy detraying. They comprise a frame and within that frame a moveable bottom as detailed in DE 10 2008 026 326 A1. The tray also contains lateral finger access pockets in the tray walls and bottom guide grooves. The tray is stackable respective nestable when empty. It is designed to be stacked on top of each other in a height saving manner, for automatic stacking, destacking, tray loading as well as safe stack transport and space saving for empty tray stack storage.

Further features and details of the invention will be apparent from the description hereinafter of the drawings.

FIG. 5 shows a schematic top view of a system of FIG. 1 with half sized goods carriers on the shelf in a gapless arrangement;

DESCRIPTION OF THE PREFERRED EMBODIMENTS

Figure 1:
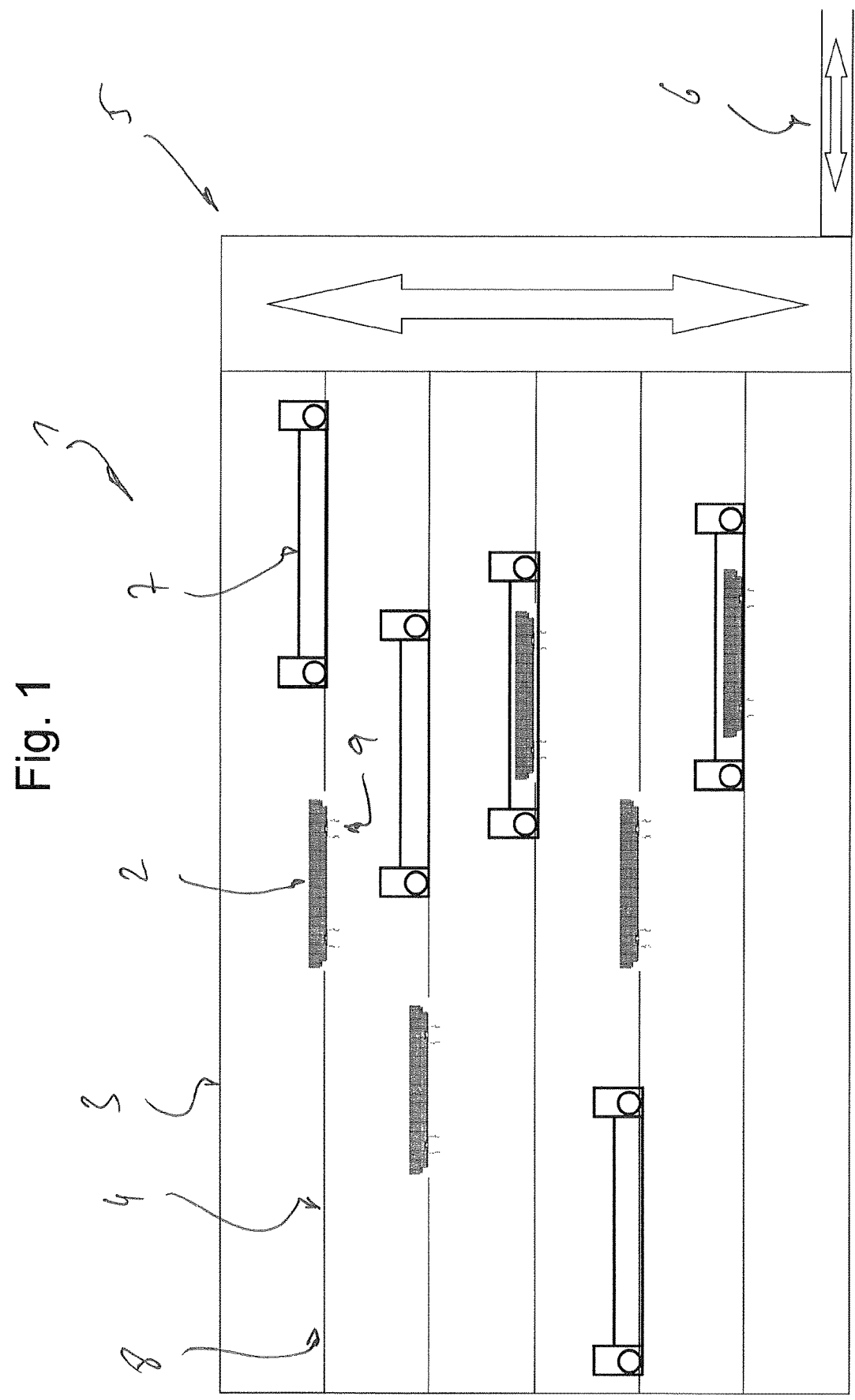
FIG. 1 shows a schematic side view of a system according to the invention.

In the figures a system designated as a whole with 1 for storage of goods carriers is shown. In the present case the goods carriers are trays 2.

The trays 2 used have a two-piece design that allows for safe transport and easy detraying. They comprise a frame 2A and within that frame a moveable bottom 2B as detailed in DE 10 2008 026 326 A1.

The system includes a rack 3 having storage shelves 4 for the trays 2 on multiple levels. The rack 3 has a vertical lift 5 for vertical movement of trays 2 between levels. The trays 2 are dropped off or picked up by the rack-servicing machines besides the lift 5 on buffers (not shown) that interface with the lift 5 (or its carriage).

In one level the lift 5 interfaces with a conveyor 6 for supply and discharge of trays 2 to the rack 3.

The rack-servicing machines 7 for storage of trays 2 into the storage shelves 4 and for discharge of trays 2 from the storage shelves 4 are of the shuttle type and run along tracks 8 extending the longitudinal extension of the rack 3 in an aisle between two racks 3 and are configured to service at least one level. The shuttles 7 are configured to carry a single full sized tray 2 or two half sized trays 2 (in rotated orientation, i.e. long side next to long side). This depends on the size of the full sized tray. If two full size trays would fit onto the shuttle, then these shall be carried as such as well in order to increase performance.

The storage shelves 4 are formed with ledgers 9 having guide strips 10. The ledgers 9 are arranged perpendicular to the longitudinal extension of the rack 3 (or aisle). Two ledgers 9 support each tray 2 from below. The ledgers 9 are arranged along the storage space of each level/shelf 4 in a pattern. The guide strips 10 on the ledgers 9 are formed by upwards facing raised beadings extending the length of the ledgers 9 preferably but not necessarily along the middle line.

Figure 2:
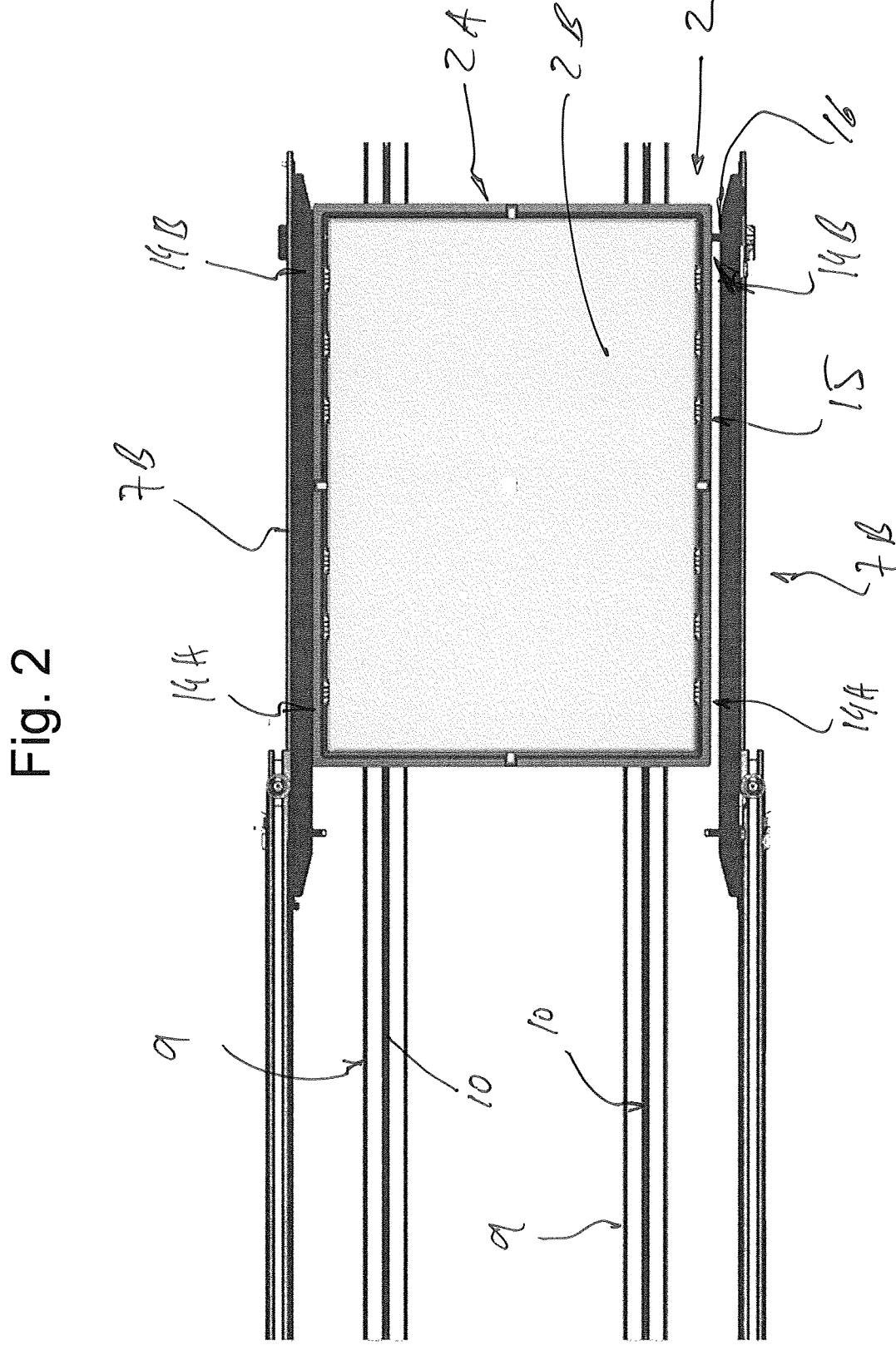
FIG. 2 shows a schematic top view of a system of FIG. 1 with a full sized goods carrier being placed.
Figure 3:
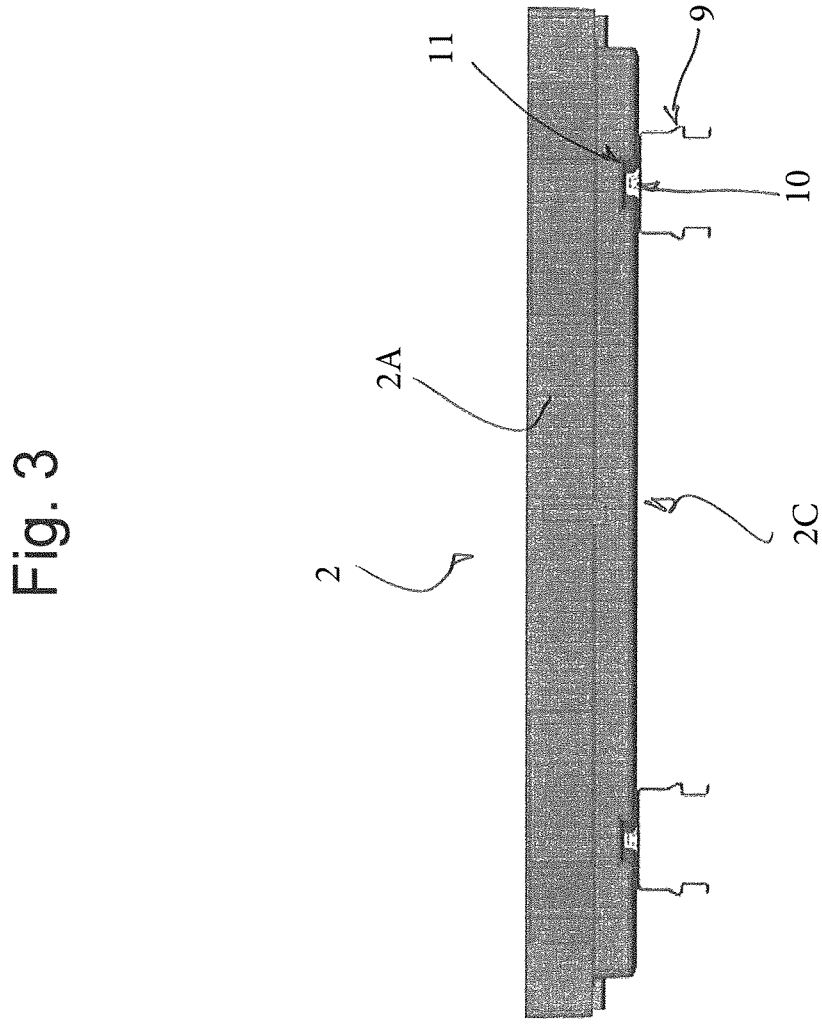
FIG. 3 shows a side view of full sized goods carrier being placed on ledgers.

The trays 2 have grooves 11 on the bottom surface 2C configured to interlock/interface with the guide strips 10 on the ledgers 9 (see FIG. 3), stopping the trays 2 from shifting the position and orientation over time. The grooves 11 have widened (chamfered) ends 12 facilitating entry of the guide strips 10 when the trays 2 are placed thereon, as can be seen in FIG. 2, in which a tray 2 is being placed on ledgers 9 by telescopic arms 7B of a shuttle 7 (not shown).

As the grooves 11 have chamfered ends 12 the entry of the guide strips 10 into the grooves 11 when performing storage of the trays 2 is facilitated while the smaller main part 13 of the grooves 11 ensures good guiding and reduction of shifting. The grooves 11 are configured to allow for tolerances in ledger position and thermal dilatation (thermal expansion) of the trays 2.

Figure 4:
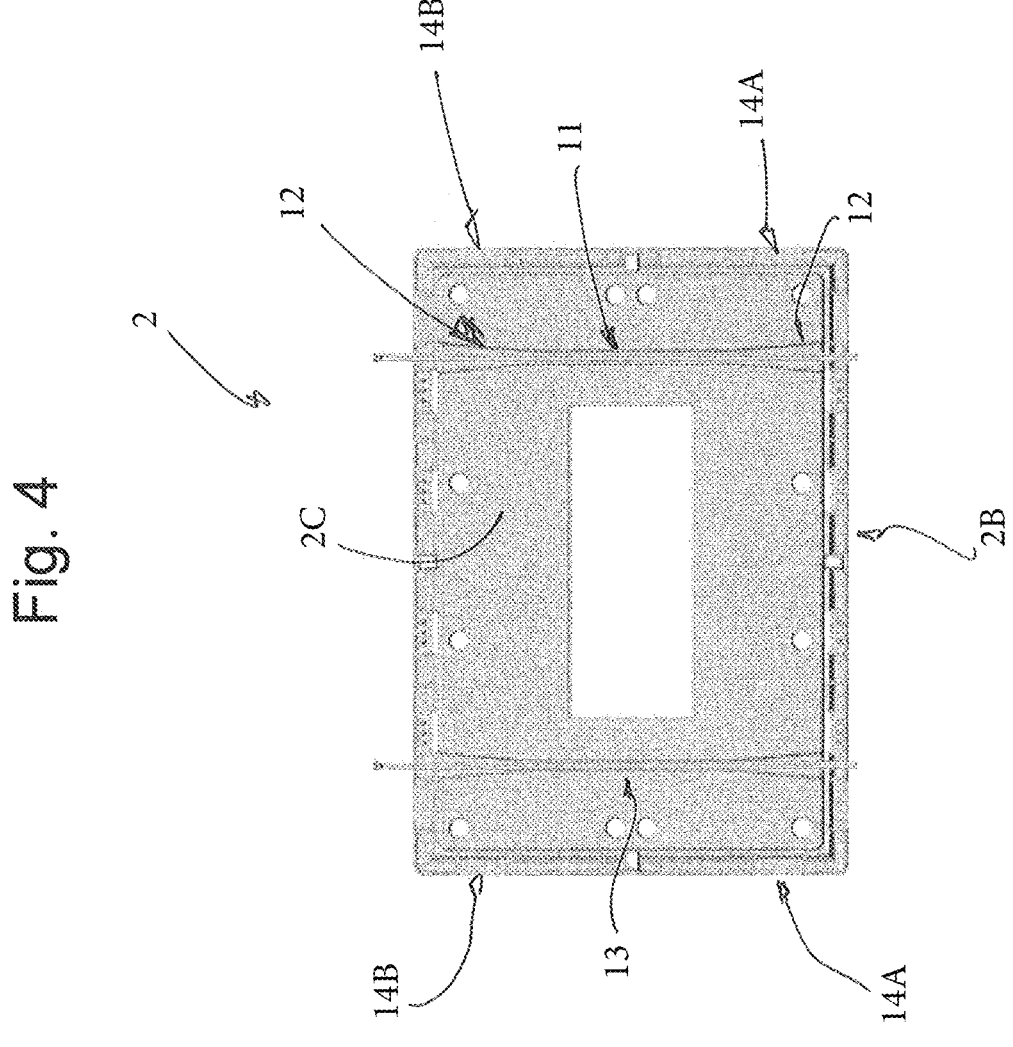
FIG. 4 shows a bottom view of a half size goods carrier with indication of guide strips.

The trays 2 are full sized (see FIG. 2) and half sized trays (see FIG. 4). The grooves 11 in the full sized trays 2 extend in longitudinal direction (see FIG. 2) and the grooves in the half sized trays (see FIG. 4) extend in lateral direction. The orientation of the grooves depend on the storage orientation of the goods carriers. This use allows to optimize storage space meaning that based on footprint two half size trays 2 are the same size as a full sized trays. Similar to paper sizes, for example A5 is half of A4 size.

Preferably only a single goods is placed on or in each goods carrier. It is however also possible to place two or more goods on or in each goods carrier.

The trays 2 have pockets 14 correspondingly located in respective opposite walls configured to allow interaction with the load handling means 7B of the shuttle 7. So it is possible to "grab" the trays 2 from the side making the pushing and pulling from behind/front unnecessary. This in turn allows a gapless storage of the goods carriers, which increases space usage in the rack (see FIG. 5). Such gapless storage has additional advantages in that the goods carriers abutting each other stabilize the respective positions as no space for movement exists between the goods carriers reducing shifting.

The trays 2 have two corresponding pockets in each respective wall. So there is a pocket 14A in the front end and one pocket 14B in back end of the respective wall. This eases storage and retrieval, as the pockets 14 may be used in different ways. For example the rear pockets 14B in travel direction are used for storage of the trays, i.e. pushing them off the shuttle, allowing for deeper storage if necessary. Whereas the front pockets 14A are used for retrieval of the trays, i.e. pulling them onto the shuttle 7, allowing for shorter extension of the telescopic arms 7B, saving cycle time.

Figure 5:
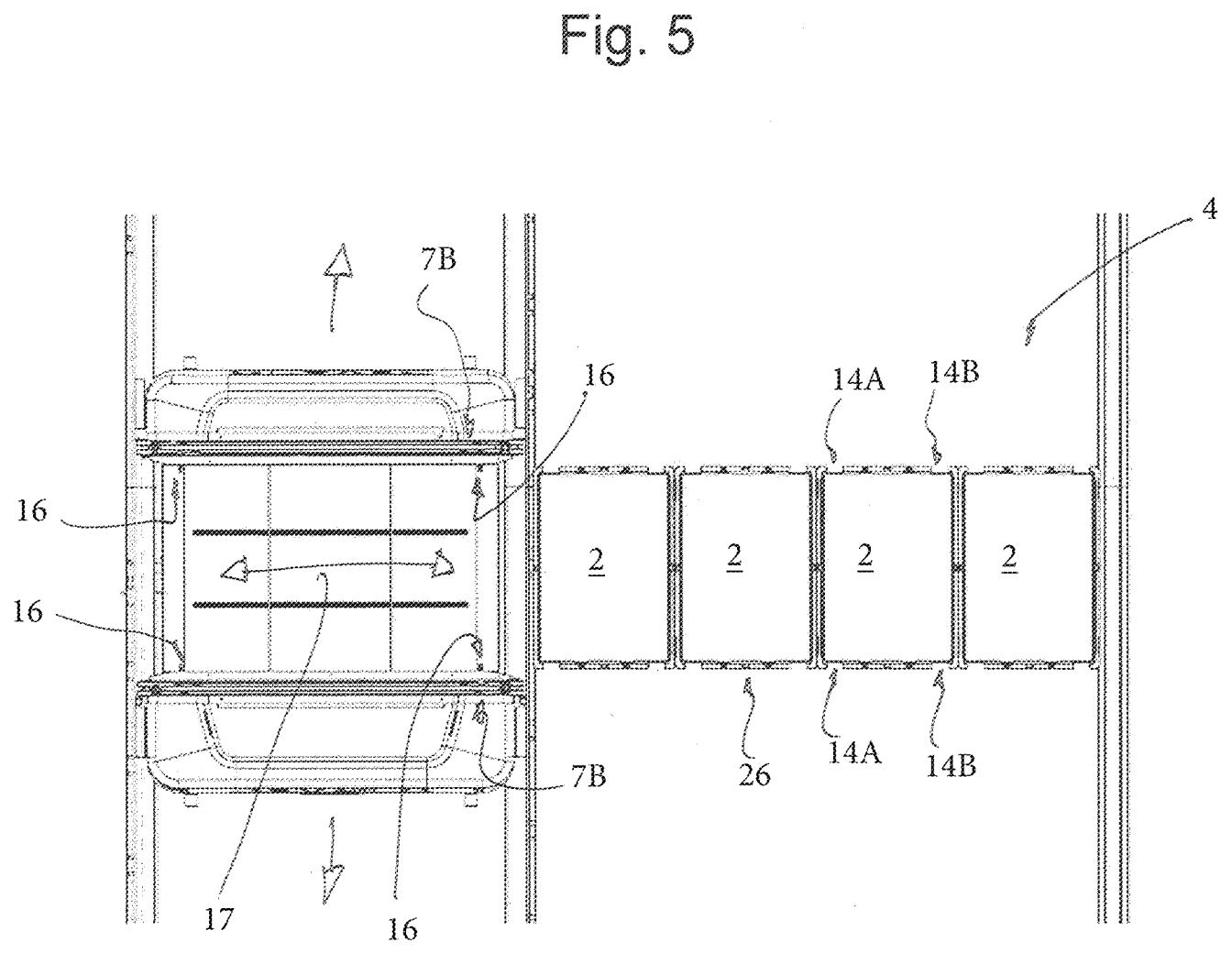

As can be deduced from FIG. 5, depending on size of tray 2, two trays can be handled at the same time. In the present case two half sized trays can be handled and also carried at the same time.

The pockets 14 are recesses in the side wall 15 or end wall 26. The trays 2 have a rectangular base (bottom) with raised circumferential walls, two side walls 15 and two end walls 16 (front and back).

The shuttle 7 includes a load carrying area 17 for carrying at least one tray 2. The load carrying area 17 has telescopic arms 7B (load handling means) arranged on opposite sides and at least one of them is configured with at least one finger 16 that can change between a retracted non-use position and an extended essentially horizontally orientated use position using a linear movement mechanism 18. The fingers 16 engage into the pockets 14 in the use position. To do so, the fingers 16 are linearly retracted or extended by linear movement mechanism 18. This allows to reduce the distance between the telescopic arms 7B and the trays 2 as no room for a swivelling movement as in the prior art is necessary (see FIG. 6). This in turn enables to shorten the extension movement and a simpler design of the telescope extraction.

Figure 6:
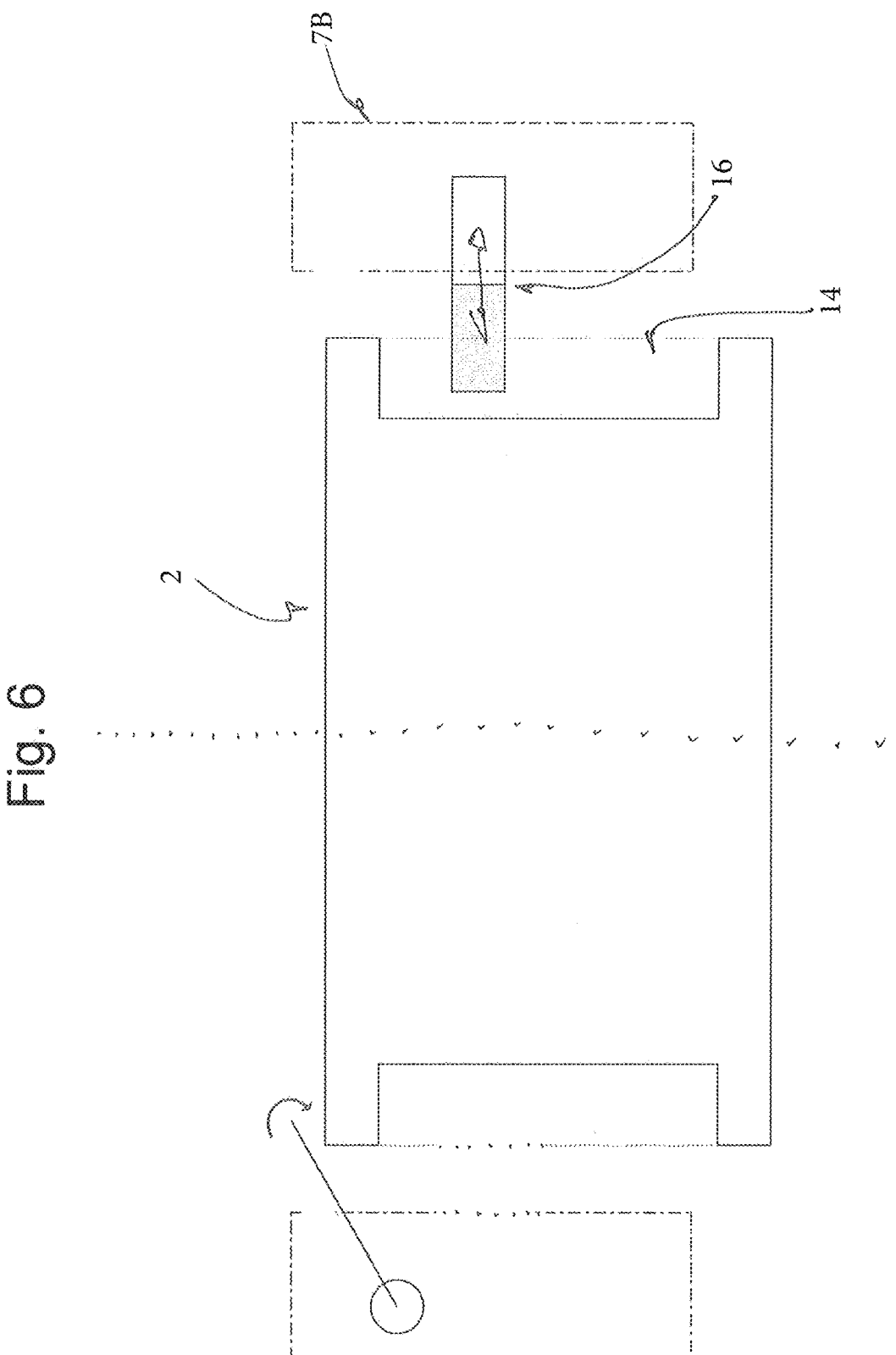
FIG. 6 shows a comparison of traditional rotary fingers vs linear fingers in accordance with the present invention.
Figure 7:
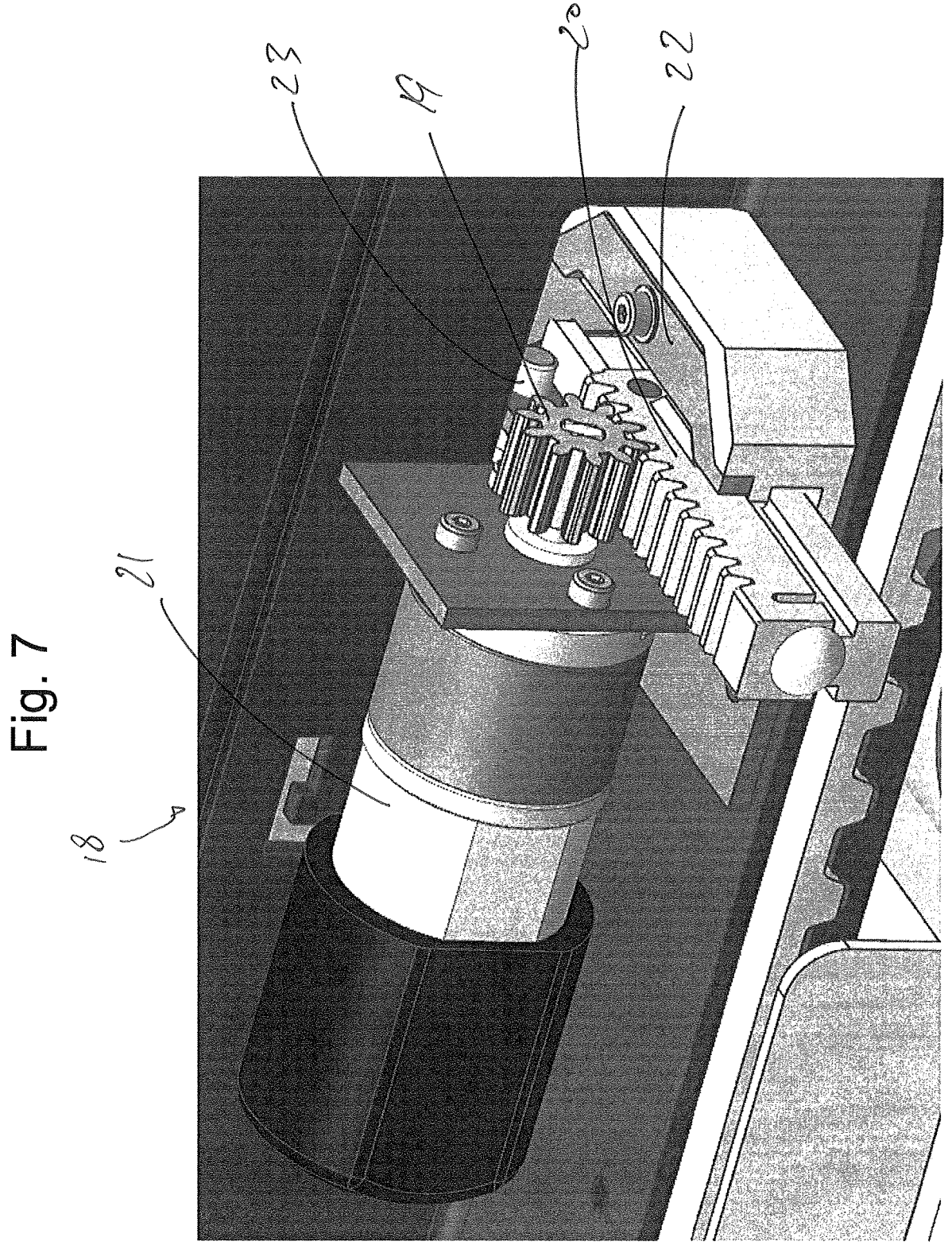
FIG. 7 shows a schematic perspective view of a linear movement mechanism of the fingers.

As can be seen in FIG. 6, which shows a conventional twistable or rotary finger on the left hand side in comparison to a linear movement finger on the right hand side, the rotary finger would contact the upper rim of the respective wall, needing more space to engage the pockets 14, if rotary fingers were used. In contrast the linearly moveable fingers of the present invention need hardly any distance and only need to extend a small portion to bridge the gap between pocket and telescopic arm to engage the tray 2.

The linear movement mechanism 18 includes a gear 19 and pinion 20 mechanism driven by an electrical gear motor 21. This drive arrangement is fixed to the telescopic arm on the opposite side of the load carrying area 17. The linear movement mechanism 18 also includes a mechanical end stop detector 22 for both retraction and extension movement. The mechanical end stops have dampening properties in order to reduce exerted peak forces to finger, pinion, drive gear and motor. There is at least one proximity switch in order to safely recognize at least one defined position of the finger.

Figure 8:
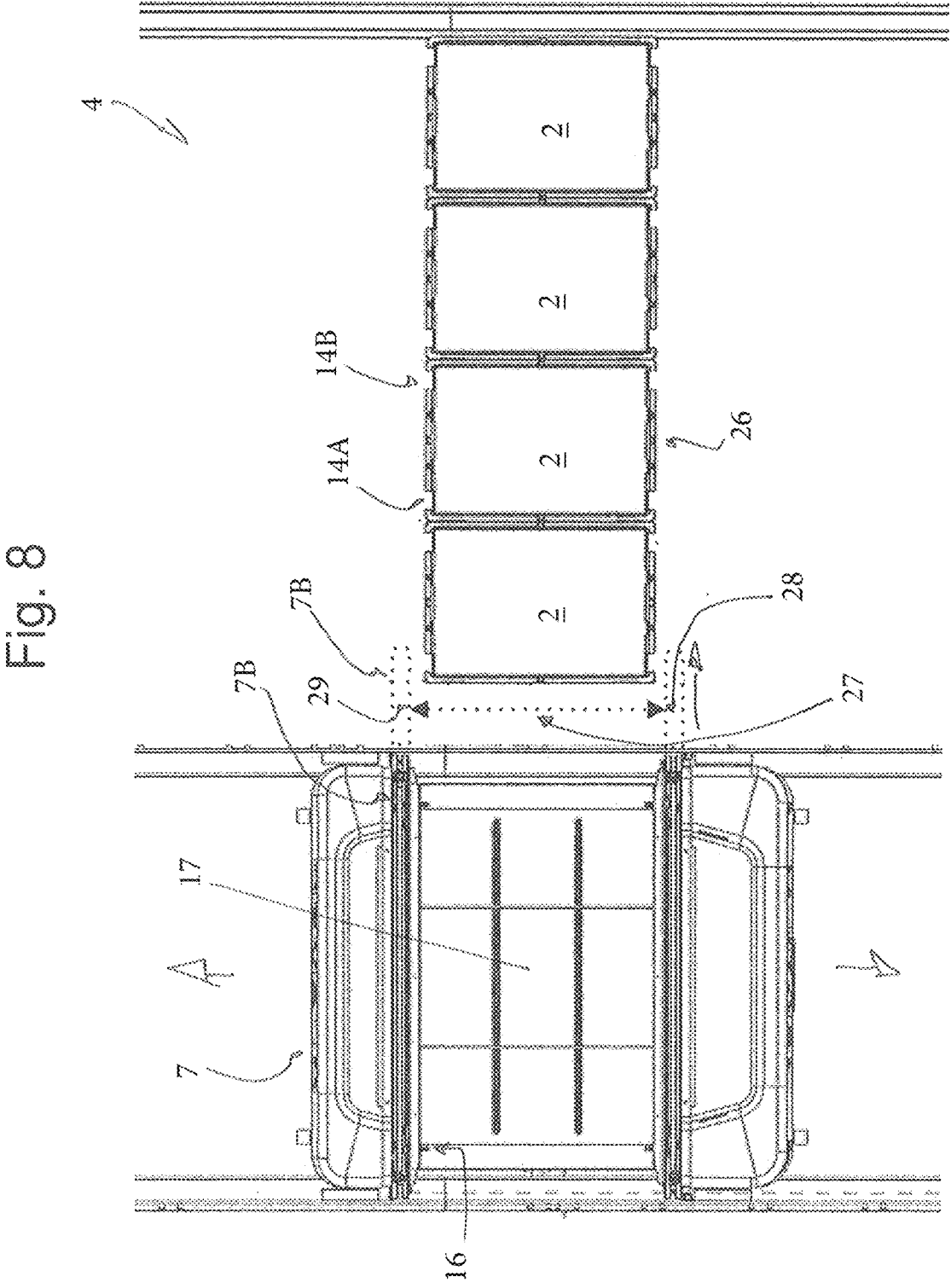
FIG. 8 shows a schematic top view of the use of photo-electric sensors for edge detection.
Figure 9:
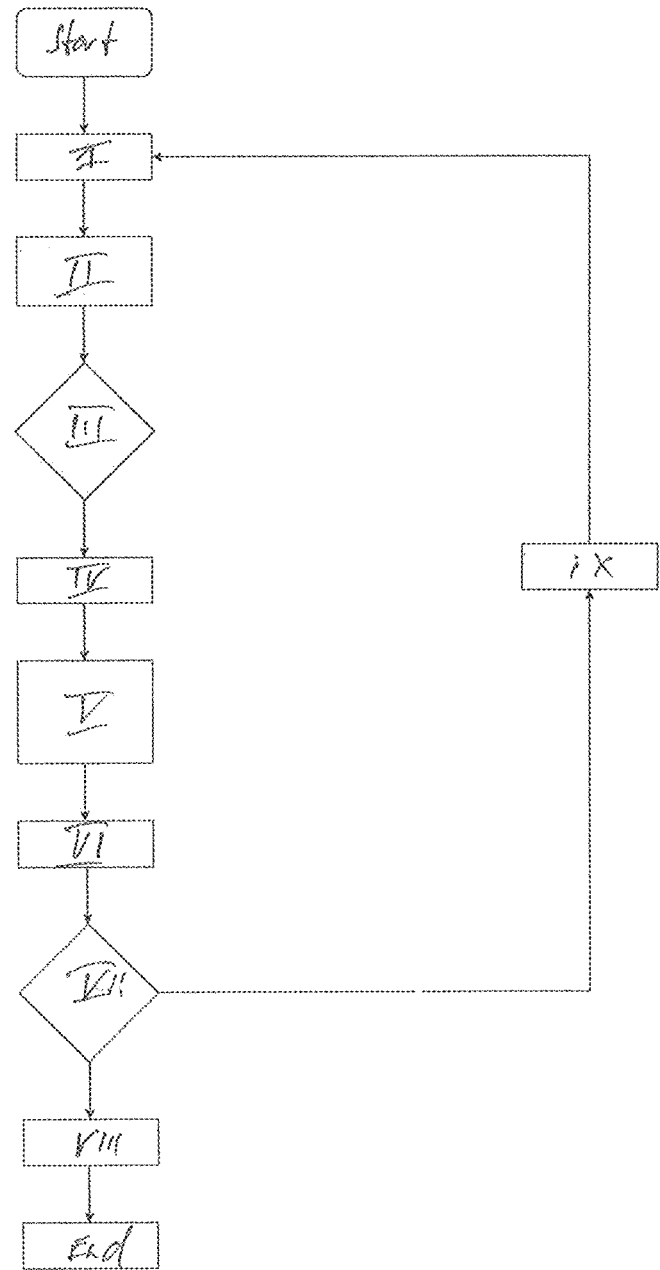
FIG. 9 shows a diagram of steps performed for edge detection.
Figure 10:
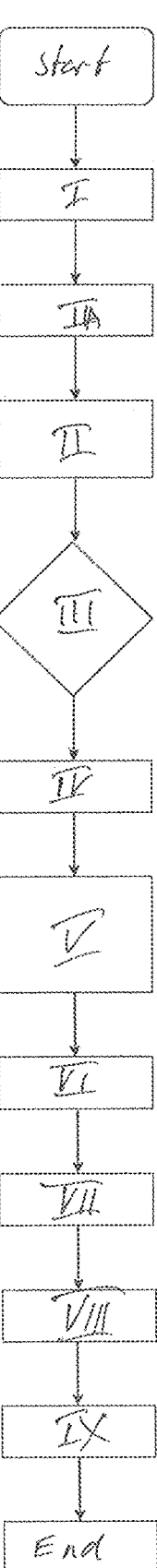
FIG. 10 shows a diagram of steps performed for double retrieval.

As detailed in relation to FIGS. 8 to 10, the telescopic arms 7B form a light switch 27 arranged between them in both end sections, allowing detection of edges of the trays 2, by detecting blockage of light by for example the leading edge. The light is produced in one arm by an LED 28 and detected in the other arm by a photocell 29.

Edge detection of the goods carrier in general may be performed to align the telescopic arms 7B and fingers 16 with the position of the pockets 14 in the goods carriers 2, for example if an engagement of pockets by the fingers was not successful. Below this process will be explained with reference to FIGS. 8 and 9: To do so the fingers are retracted and the telescopic arms are first centered to set a reference point (step I of FIG. 9). Then they are extended in direction of the trays (step II, see arrow of hashed telescopic arms 7B in FIG. 8) while a photoelectric switch 29 or light barrier arranged between the two telescopic arms is active to detect the leading edge of the first goods carrier in the storage (step III). Then based on this position determination (step IV) the controller can deduce/calculate the position of the pockets correctly (step V), as the dimensions of the goods carriers are known. This in turn allows the telescopic arms to be positioned with the fingers at the calculated location of the pockets 14B (step VI). If this does not lead to success (VII), the process is repeated (IX), otherwise the process is finished (step VIII).

To further optimize the storage and retrieval process, the shuttles 7 may receive instructions to retrieve two trays 2 simultaneously that are abutting each other in the storage to save space (gapless storage, see FIG. 8). Below this process will be explained with reference to FIGS. 8 and 10: To do so the fingers are retracted and the telescopic arms are first centered to set a reference point (step I of FIG. 10) and the fingers 16 are retracted (step IA). Then the telescopic arms 7B are extended in direction of the trays (step II, see arrow of hashed telescopic arms 7B in FIG. 8) while a photoelectric switch 29 or light barrier arranged between the two telescopic arms is active to detect the leading edge of the first goods carrier in the storage (step III). Then based on this position determination (step IV) the controller can deduce/calculate the position of the pockets correctly (step V), as the dimensions of the goods carriers are known. This in turn allows the telescopic arms to be positioned with the fingers at the calculated location of the pockets 14B of the second tray 2 (step VI). Then the fingers are extended and engage the pockets 14B of the respective tray 2 (step VII). Afterwards the telescopic arms 7B are retracted pulling both trays 2 onto the shuttle 7 (step VIII).

To secure the trays 2 on the shuttle 7 during transportation, the fingers 16 in the telescopic arms 7B may be extended into the pockets 14B thereby locking the trays 2 into position.

If two goods carriers are transported at the same time as above, the outer finger pairs not used for retrieval can be used to engage the respective pockets 14B of the front tray. To do so the front tray 2 can be pushed to the other side of the loading area 17 to be repositioned for engagement of its pockets 14B by the other outer fingers pair (step IX) for securing.

The invention claimed is:

1. A system for gapless storage of goods carriers abutting each other, said system comprising:
   a plurality of goods carriers;
   a longitudinally extending rack having storage shelves for the goods carriers on multiple levels;
   a rack-servicing machine for storage of goods carriers into the storage shelves and for discharge of goods carriers from the storage shelves, the rack-servicing machine comprising a shuttle having a load handler and being configured to run along tracks extending the longitudinal extension of the rack and configured to service one level of the rack;
   wherein the goods carriers comprise opposite walls and have at least two pockets correspondingly located in the respective opposite walls, wherein the at least two pockets comprise recesses or cavities in the respective opposite walls and are configured to allow interaction with the load handler of the rack-servicing machine, and wherein each respective opposite wall includes a pair of end areas and wherein the goods carriers have two corresponding pockets in each respective opposite wall, one in each end area of the wall;
   wherein the shuttle includes a load carrying area for carrying at least one goods carrier and the load handler comprises telescopic arms arranged on opposite sides of the load carrying area with each arm configured with at least two fingers that can change between a retracted non-use position and an extended use position via a drive mechanism;
   wherein the drive mechanism comprises a linear drive mechanism and the fingers are linearly retracted or extended by the linear drive mechanism, and wherein the linear drive mechanism comprises a driven gear and a pinion mechanism.

2. The system according to claim 1, wherein the fingers engage into the pockets in the use position.

3. The system according to claim 2, wherein the linear driver mechanism includes a mechanical end stop for both retraction and extension movement.

4. The system according to claim 3, wherein the mechanical end stop comprises a dampener and includes at least one proximity switch in order to safely recognize at least one defined position of the finger.

5. The system according to claim 1, wherein the goods carriers are full sized and half sized goods carriers.

6. The system according to claim 5, wherein the goods carriers are trays.

7. The system according to claim 1, wherein the goods carriers are trays.

8. The system according to claim 1, wherein the tracks along which the rack-servicing machine runs extend in an aisle between two racks.

9. The system according to claim 1, wherein the linear driver mechanism includes a mechanical end stop for both retraction and extension movement.

10. The system according to claim 9, wherein the mechanical end stop comprises a dampener and includes at least one proximity switch in order to safely recognize at least one defined position of the finger.

* * * * *